US012729314B2

(12) United States Patent
Pironti et al.

(10) Patent No.: US 12,729,314 B2
(45) Date of Patent: Sep. 8, 2026

(54) RADAR-ENABLED COATING CONTAINING METAL EFFECT PIGMENTS ON A SUBSTRATE

(71) Applicant: Susonity Commerical GmbH, Gernsheim (DE)

(72) Inventors: Gianfranco Pironti, Darmstadt (DE); Christoph Landmann, Darmstadt (DE)

(73) Assignee: Susonity Commercial GmbH, Gernsheim (DE)

( * ) Notice: Subject to any disclaimer, the term of this patent is extended or adjusted under 35 U.S.C. 154(b) by 412 days.

(21) Appl. No.: 18/017,725

(22) PCT Filed: Aug. 31, 2021

(86) PCT No.: PCT/EP2021/073926

§ 371 (c)(1),
(2) Date: Jan. 24, 2023

(87) PCT Pub. No.: WO2022/049041

PCT Pub. Date: Mar. 10, 2022

(65) Prior Publication Data

US 2023/0265299 A1 Aug. 24, 2023

(30) Foreign Application Priority Data

Sep. 3, 2020 (EP) .................................... 20194397

(51) Int. Cl.
*C09D 7/40* (2018.01)
*C09D 5/00* (2006.01)
*C09D 7/61* (2018.01)

(52) U.S. Cl.
CPC ............... *C09D 7/70* (2018.01); *C09D 5/002* (2013.01); *C09D 7/61* (2018.01)

(58) Field of Classification Search
CPC ............ C09C 1/0015; C09D 5/36; C09D 7/70
See application file for complete search history.

(56) References Cited

U.S. PATENT DOCUMENTS

| | | | | |
|---|---|---|---|---|
| 6,184,842 | B1 | 2/2001 | Leinweber et al. | |
| 6,328,358 | B1 | 12/2001 | Berweiler | |
| 8,846,194 | B2 | 9/2014 | Maruoka et al. | |
| 9,494,679 | B2 | 11/2016 | Keckes et al. | |
| 2005/0238802 | A1* | 10/2005 | Friese | C09D 5/36 427/402 |
| 2013/0276950 | A1 | 10/2013 | Richter | |
| 2015/0064482 | A1* | 3/2015 | Fan | B05D 7/572 427/372.2 |
| 2016/0326665 | A1* | 11/2016 | Steinmetz | C25D 13/22 |
| 2018/0194111 | A1 | 7/2018 | Yamane et al. | |
| 2020/0017047 | A1* | 1/2020 | Kondo | C09D 7/69 |
| 2020/0115567 | A1 | 4/2020 | Yamakawa et al. | |
| 2021/0078313 | A1 | 3/2021 | Ono et al. | |
| 2021/0087403 | A1 | 3/2021 | Schmitt et al. | |

FOREIGN PATENT DOCUMENTS

| | | | | |
|---|---|---|---|---|
| CN | 109679412 | A | 4/2019 | |
| DE | 19844021 | C2 | 5/2001 | |
| DE | 102007062945 | A1 | 6/2009 | |
| DE | 102009029763 | A1 | 12/2010 | |
| DE | 102011016683 | A1 | 8/2012 | |
| DE | 102019209893 | A1 | 1/2020 | |
| EP | 0954052 | B1 | 12/2008 | |
| EP | 2837432 | A1 * | 2/2015 | B05D 5/068 |
| EP | 3795645 | A1 | 3/2021 | |
| JP | 2003117481 | A | 4/2003 | |
| JP | 2004244516 | A | 9/2004 | |
| JP | 2010030075 | A | 2/2010 | |
| JP | 2017019147 | A | 1/2017 | |
| JP | 2019120511 | A | 7/2019 | |
| JP | 2020059804 | A | 4/2020 | |
| WO | 2019117284 | A1 | 6/2019 | |

OTHER PUBLICATIONS

Database WPI Week 201946, Derwent World Patents Index; AN 2019-41112A, (AP=CN201811630188 dated Dec. 28, 2018) XP002804864 (pp. 1-4).

International Search report PCT/EP2021/073926 dated Dec. 7, 2021 (pp. 1-5).

* cited by examiner

*Primary Examiner* — Alexandre F Ferre
(74) *Attorney, Agent, or Firm* — Millen, White, Zelano & Branigan, P.C.; Brion P. Heaney

(57) ABSTRACT

The present invention relates to a radar-compatible coating comprising metal-effect pigments on a substrate, to a process for the production of such a coating, and to the use of a substrate coated in this manner, in particular in vehicle construction.

23 Claims, No Drawings

RADAR-ENABLED COATING CONTAINING METAL EFFECT PIGMENTS ON A SUBSTRATE

The present invention relates to a radar-compatible coating comprising metal-effect pigments on a substrate, to a process for the production of such a coating, and to the use of a substrate coated in this manner, in particular in vehicle construction.

With the increase in vehicles that enable autonomous driving, it is necessary to integrate radar devices which enable both distance measurement to other vehicles or traffic obstacles and the measurement of the speed of other traffic participants into the corresponding automobile parts to a hitherto unimagined extent. Such radar devices are generally installed behind bumpers of vehicles in order not to adversely impair the visual appearance of the vehicle.

For many years, metallic paints, preferably silver-coloured metallic paints, have counted amongst the most popular vehicle paints, in particular for the private vehicle sector. However, these metallic paints represent a major challenge in relation to the optical design of cover parts for radar devices installed in the interior of such vehicles since the usual metallic paints, which contain aluminium-based metal-effect pigments, can reflect, attenuate or absorb the radar waves, which are usually in the frequency range 76-81 GHz, to such an extent that the use of previously customary metallic vehicle paints for cover parts of radar devices in vehicles would lead to an undesired reduction in the functionality of the radar devices.

There has therefore been no lack of attempts to provide solutions for the covering of vehicle radar devices that do not impair the visual appearance of the vehicles and enable good functionality of the installed radar devices.

Thus, the corresponding cover parts are designed, for example, as radiator grills which have very substantially radar wave-transparent areas and metallised struts which only slightly attenuate the ability of radar waves to pass through.

Such cover parts are described, for example, in DE 198 44 021 C2. Here, the outwardly visible metal layer consists of a vapour-deposited indium layer having a thickness in the nanometre range. The visual impression of the radiator grill struts coated in this way is claimed to be equivalent to chrome-plating.

It is also possible to provide company badges, as described, for example, in EP 954 052 B1, with an extremely thin, sputtered metal layer of this type.

In DE 10 2011 016 683 A1, by contrast, a black plastic substrate is coated with a layer of silicon whose thickness is in the nanometre range.

The said cover parts are radiator grills or company badges which are intended to have in part-areas an outwardly visible lustre which corresponds to a chrome lustre. However, coatings of this type are not suitable for vehicle parts which, although located in the beam path of a radar device, are not intended to leave the observer with the visual impression of a conventional silver-coloured or coloured metallic paint. The difficulty here consists in achieving the strong lightness flop that is usual in the case of metallic paints (clear change from light to dark on changing the illumination or viewing angle), achieving the hiding power of metallic paints, and reducing the attenuation of radar waves to such an extent that the transmission of the radar waves is sufficient to be able to operate an installed radar device in a fully functional manner.

JP 2004-244516 A discloses a lustrous product having high transparency for electromagnetic radiation which can be employed as radiator grill, but also as component of another vehicle part, for example of a tailgate. A layer on a polycarbonate panel here may comprise metal particles, such as zinc, tin or indium, but may instead also be pigmented with interference pigments, such as, for example, titanium dioxide-coated mica. The particles are applied to the panel in a concentration of 3 to 8% by weight in a polyurethane-containing layer. A black base coat is applied as reverse-side coating.

The lustrous product obtained comprising a plurality of layers is claimed to have high transparency for electromagnetic radiation and high lustre.

Although good transparency for radar radiation can be achieved with interference pigments comprising titanium dioxide-coated mica in such coatings, the hiding power of metallic finishes and the strong metallic lightness flop that can be achieved with the latter is, however, not obtainable with such mica-based interference pigments having a simple structure alone.

JP 2010-030075 A therefore proposes a layer which, besides glass flakes or titanium dioxide-coated mica, also comprises aluminium pigments in low concentration on a plastic substrate and which can be employed, for example, for vehicle bumpers. The low concentration of the aluminium pigments in this layer and the relatively large separation that can consequently be achieved between the individual aluminium pigment particles are claimed to lead to good radar transparency at the same time as high lustre. However, the aluminium pigments present only in small amounts cannot achieve the hiding power that is customary from metallic paints, while the glass flakes or $TiO_2$-mica pigments have virtually no hiding power.

DE 10 2019 209 893 A1 also discloses a radar wave-transparent coating for a vehicle part, for example a radiator grill, which comprises a mixture of aluminium pigments and silicate-based pigments in a layer on a plastic substrate. The latter pigments can be titanium dioxide-coated mica or titanium dioxide-coated glass. A second layer located beneath this layer on the substrate has low lightness and is preferably black. The radiator grill obtained is said to have a mother-of-pearl-like white colour and thus a metal-like appearance. However, the visual impression of a metallic finish likewise cannot be achieved with a layer structure of this type.

The object of the present invention consists in providing a radar wave-transparent coating on a substrate, which coating is suitable for use for cover parts of radar devices, in particular in vehicle construction, and comprises conventional metal-effect pigments, in particular aluminium pigments, preferably differs as little as possible visually from conventional vehicle metallic finishes and in particular has a metallic appearance, high hiding power and a strong lightness flop at the same time as good transparency for radar waves.

A further object of the present invention consists in providing a process for the production of the above-mentioned coating.

In addition, a further object of the present invention consists in indicating the use of a coating of this type.

The object of the present invention is achieved by a radar-compatible coating comprising metal-effect pigments on a substrate, where the coating has at least one layer package consisting of:

a layer (A) which comprises at least one pigment having absorbent properties and is free from metal-effect pigments, and a layer (B) which comprises flake-form effect pigments, where the flake-form effect pigments are exclusively metal-effect pigments, and where layer (B) has a layer thickness in the range from 2 to ≤10 μm.

In addition, the object of the present invention is also achieved by a process for the production of a radar-compatible coating comprising metal-effect pigments on a substrate, in which a layer (A) which comprises at least one pigment having absorbent properties and is free from metal-effect pigments is applied to an optionally pre-coated substrate comprising a plastic plate or plastic film, and subsequently a layer (B) which comprises flake-form effect pigments, where the flake-form effect pigments are exclusively metal-effect pigments, and where layer (B) has a dry layer thickness in the range from 2 to ≤10 μm, is applied to layer (A)

or a layer (B) which comprises flake-form effect pigments, where the flake-form effect pigments are exclusively metal-effect pigments, and where layer (B) has a dry layer thickness in the range from 2 to ≥10 μm, is applied to an optionally pre-coated substrate comprising a plastic plate or plastic film, and subsequently a layer (A) which comprises at least one pigment having absorbent properties and is free from metal-effect pigments is applied to layer (B).

In addition, the object of the invention is also achieved by the use of the coating described above on a substrate as radar-compatible vehicle finish on a vehicle part.

The present inventors have surprisingly found that, in contrast to the solutions described in the prior-art documents, it is possible to provide cover parts of radar devices in vehicle construction with coatings which have a layer comprising flake-form effect pigments, where the flake-form effect pigments consist exclusively of metal-effect pigments. A layer of this type is therefore very similar to a layer in a conventional metallic finish. However, particular precautions must be taken in order to achieve sufficiently high radar wave transmission, which is necessary for proper operation of radar devices. Thus, for example, it is essential that the coating layer comprising metal-effect pigments has only a low layer thickness. In accordance with the invention, this is in the range from 2 to ≤10 μm. Within this layer-thickness range, preferred ranges can be set via the selected concentration of metal-effect pigments in the coating composition used. Thus, in the case of a comparatively high proportion of metal-effect pigments in the coating composition, layer thicknesses in the range from preferably 4 to 7 μm are sufficient, while in the case of a comparatively low concentration of metal-effect pigment in the coating composition, layer thicknesses in the range from >7 to <10 μm are more advantageous. It goes without saying that layer-thickness variations within a layer as a consequence of the process technology must not play a role in the case of the layer-thickness ranges given here. The crucial factor is the target average layer thickness for the respective coating operation.

For the desired mode of functioning of the coating, however, it is of particular importance that this layer comprising metal-effect pigments is part of a layer package which is located on a suitable substrate.

The layer pigmented with metal-effect pigments is referred to in the present description as layer (B) of the layer package. It is located either immediately above layer (A) on the substrate, viewed from the substrate, but may also be located immediately below a layer (A), viewed from the substrate. In both variants, good radar wave transmission of the coating on the substrate can be achieved, while the visual appearance of the two variants differs.

The layer package in accordance with the present invention therefore consists of a layer (A) and a layer (B) on a substrate, where, in a first embodiment, layer (B) is located directly on layer (A) and thus represents the outermost layer of the layer package on the substrate, or, in a second embodiment, layer (A) is located directly on layer (B) and thus represents the outermost layer of the layer package on the substrate.

In accordance with the invention, layer (A) of the layer package comprises at least one pigment (one type) having absorbent properties. This can be organic absorption pigments, inorganic absorption pigments and/or flake-form effect pigments having absorbent properties. The pigments having absorbent properties may in each case be present in layer (A) individually or as a mixture within a substance class (for example as a mixture of various inorganic or organic absorption pigments), as a mixture from different substance classes (for example as a mixture of flake-form effect pigments having absorbent properties and organic and/or inorganic absorption pigments) or also as a mixture of organic and/or inorganic absorption pigments with flake-form, non-metallic effect pigments without absorbent properties. Layer (A) preferably comprises at least one flake-form effect pigment (one type) having absorbent properties, where organic absorption pigments and/or inorganic absorption pigments may optionally likewise be present. It is essential to the invention that the flake-form effect pigment having absorbent properties that is present in layer (A) cannot be a metal-effect pigment.

The organic or inorganic pigments having absorbent properties used can be all absorption pigments that are usually employed in various industrial coatings. These are preferably present with a particle diameter in the range from 10 to 500 nm, in particular from 10 to <100 nm. In combination with flake-form effect pigments, their special effects, such as lustre, glitter and interference colours, take effect visually particularly well if additionally employed absorption pigments, irrespective of whether of an organic or inorganic nature, have such small particle diameters that they are transparent for incident light. In such cases, the particle diameter of the absorption pigments is preferably in the range from 10 to <40 nm. Preparations of absorption pigments are generally commercially available. Depending on compatibility with the paint systems employed, systems such as, for example, Heucotint® W (Heubach, DE), Heucotint® UN (Heubach, DE), MIPA WBC (Mipa, DE), Standoblue® (Standox GmbH, DE), Standohyd® (Standox GmbH, DE), Vocaflex® (Arichemie, DE), Vocaplast® (Arichemie, DE), or also others come into consideration.

Suitable absorption pigments are, for example, isoindolidones, benzimidazoles, quinacridones, Cu phthalocyanines, perylenes, carbon black and/or titanium dioxide, to mention just a few.

Preferably suitable for use in the coating according to the invention, here in layer (A), are inorganic and organic absorption pigments, individually or in a mixture, inorganic and/or organic absorption pigments in a mixture with non-metallic flake-form effect pigments without absorbent properties, or flake-form effect pigments having absorbent properties, optionally in a mixture with organic and/or inorganic absorption pigments.

In a preferred embodiment, layer (A) of the layer package of the coating according to the invention comprises a flake-form effect pigment having absorbent properties.

In particular, use is made in accordance with the invention of flake-form interference pigments which have absorbent properties.

The optical effect of flake-form interference pigments generally consists of a combination of reflection and transmission phenomena of light at a sequence of thin layers of which effect pigments of this type, usually on a flake-form support material, generally consist. Use is very frequently made here of only materials which are colourless and are very substantially transparent to visible light, such as, for example, flake-form mica pigments coated with titanium dioxide. Such pigments can have a silvery interference colour or also chromatic interference colours, but are overall transparent and have no mass tone. They can be employed in layer (A) of the coating according to the invention only in combination with organic and/or inorganic absorption pigments.

Interference pigments achieve absorbent properties and thus a mass tone if either the flake-form support or alternatively at least one of the layers located on the flake-form support consists of a material which has an inherent colour, i.e. an absorption colour. These can be coloured metal oxides, metal suboxides, mixed metal oxides or oxygen-deficient metal oxides or metal oxide hydrates.

Interference pigments also achieve absorbent properties due to layers which comprise organic coloured pigments.

Also suitable in addition are the so-called carbon inclusion pigments, which comprise a proportion of elemental carbon in at least one of the layers of which a flake-form interference pigment consists.

It is particularly preferably also possible to employ interference pigments which have on a transparent support flake one or more interference layers and, as the final layer, a very thin, light-transmitting layer consisting of carbon. Such pigments have been described, for example, in the patent application EP 3795645 A1 by the present patent proprietor.

Flake-form effect pigments having absorbent properties which are preferably employed in accordance with the invention are interference pigments which have at least one layer comprising iron oxides, such as $Fe_2O_3$, FeO, $Fe_3O_4$, FeOOH, titanium suboxides, such as TiO, $Ti_2O_3$, $Ti_3O_5$, $Ti_4O_7$, $Ti_2O$, $Ti_3O$ or $Ti_6O$, or chromium oxides, such as $Cr_2O_3$, or a layer consisting of carbon.

Flake-form support materials which come into consideration are natural or synthetic mica, kaolin, talc or sericite, in addition also glass, calcium aluminium borosilicate, $SiO_2$, $TiO_2$, $Al_2O_3$, graphite flakes or iron oxide flakes. The flake-form support materials employed are preferably natural or synthetic mica, calcium aluminium borosilicate flakes, glass flakes, $SiO_2$ flakes or $Al_2O_3$ flakes.

Interference pigments which exhibit chromatic interference colours and a chromatic absorption colour can readily be employed in layer (A). Thus, for example, an interference pigment which is marketed by Merck KGaA, Darmstadt, under the trade name Colorstream® F10-51 Lava Red has proven to be a particularly suitable coloured interference pigment. The pigment is based on a flake-form $SiO_2$ substrate and is coated with $Fe_2O_3$.

Use is very particularly preferably made of interference pigments having a silver-grey absorption colour. Such interference pigments are available, for example, from Merck KGaA under the trade names Iriodin® 9602 SilverGrey SW, Iriodin® 9605 Blue Shade Silver SW and Iriodin® 9612 SilverGrey Fine Satin SW. These are based on mica flakes and have at least one layer comprising $Fe_2O_3$ or a titanium suboxide.

The interference pigments which have an absorption colour, in particular a silver-grey absorption colour, can also, as already described above, be employed in a mixture with other pigments having absorbent properties, for example in a mixture with carbon black.

It has been found that interference pigments having a silver-grey absorption colour are particularly suitable for use as pigments having absorbent properties in layer (A) if the coating as a whole is intended to have a silver-metallic appearance. Due to the pigment structure in the form of sequences of thin layers on flake-form substrates, interference pigments of this type exhibit a visually perceptible lustre when incident light hits them. Since layer (B), which comprises the metal-effect pigments, has a very low layer thickness, its hiding power alone is not sufficient to obtain the overall visual impression of an opaque silver-metallic finish. The hiding power of layer (B) is therefore effectively supplemented by the hiding power of the pigments having absorbent properties in layer (A), in particular if interference pigments having a silver-grey absorption colour are present. The silver-grey absorption colour of the interference pigments ensures that layers (A) and (B) of the layer package are located in the same colour range and the coating formed by the layer package leaves an intrinsically homogeneous silver-metallic impression with high hiding power, high lustre and clear lightness flop if layer (B) comprises silver-coloured metallic effect pigments, for example silver-coloured aluminium pigments.

An opaquely silver-coloured appearance of the overall layer package of the coating arises both in the case of the sequence of layers (A)-(B) and also in the case of the sequence of layers (B)-(A), viewed from the substrate. The lustre that can be achieved with layer sequence (A)-(B) and the lightness flop of the coating are more pronounced than in layer sequence (B)-(A). By contrast, the radar capability of the two embodiments is in the same order of magnitude.

In order to achieve a silver-coloured overall impression of the layer package, it is therefore particularly advantageous for the success of the present invention if layer (A) of the layer package comprises pigments having absorbent properties in such a type and amount that layer (A), considered individually, has a grey shade and is therefore achromatic and is in the middle lightness range (L*15° over black in the L*, a*, b* colour space in the range from 40 to 90). The determination of the L*15 value is described in the example part. For this purpose, pigmentation of layer (A) with interference pigments having a silver-grey absorption colour has proven very particularly suitable. Inorganic or organic absorption pigments, advantageously having an achromatic absorption colour, may additionally be present in the first layer.

Absorption pigments having chromatic absorption colours, particular interference pigments having chromatic absorption colours, can also be employed in layer (A) in order to increase the hiding power of layer (B). In the layer sequence (A)-(B) on the substrate, the visual appearance of the overall layer package depends on the metal-effect pigments employed. In the case of silver-coloured metal-effect pigments in layer (B), a slight colour shift of the silver-metallic overall impression towards the absorption colour of the interference pigments having chromatic absorption colours arises, which may be desired as a particular colour nuance. If, by contrast, coloured metal-effect pigments in layer (B) are combined with interference pigments having absorption colours in the same colour range, for example in the orange or red region, in layer (A), vivid metallic effects in saturated colours can be achieved. In the case of a layer sequence (B)-(A) on the substrate, such metallic effects with saturated colours already arise on use of silver-coloured metal-effect pigments in layer (B). The perceptible colour of the overall coating then corresponds to the absorption colour of the nonmetallic interference pigment if no further colouring pigments are present in layer (A).

In accordance with the invention, layer (A), which comprises pigments having chromatic absorption colours, has a lightness L*15° over black (in the L*, a*, b* colour space) in the range from 50 to 100 (measurement conditions in the example part).

A layer (A) of the layer package which would, by contrast, have a black appearance due to the content of pigments having absorbent properties would be rather unsuitable for the coating according to the invention since the overall visual appearance of the coating, caused by the low layer thickness of layer (B) in the layer sequence (A)-(B), would have a cloudy or patchy character. Even with the layer sequence (B)-(A), an uneven visual appearance would be obtained. A layer (A) having a black coloration is therefore not preferred in accordance with the present invention.

The total concentration of the pigments having absorbent properties in layer (A) is in the range from 10 to 25% by weight, preferably in the range from 15 to 20% by weight, based on the weight of layer (A).

If interference pigments having absorbent properties are employed in the first layer, these generally have particle sizes in the range from 1 to 100 μm, in particular from 2 to 70 μm and particularly preferably in the range from 3 to 50 μm. The thickness of the interference pigments is in the range from 0.1 to 2 μm.

By contrast, classical absorption pigments, which can be of an organic or inorganic nature, have particle diameters in the range from about 10 to <100 nm, preferably from 1 to <40 nm.

In contrast to layer (A) of the layer package employed in accordance with the invention, layer (B) comprises exclusively metal-effect pigments as flake-form effect pigments.

Metal-effect pigments in the sense of the present invention are taken to mean flake-form effect pigments which consist of metals or have at least one metal layer. These include, in particular, the aluminium pigments usually employed in metallic finishes, which are suitable for use in the coating according to the invention in the form of so-called cornflakes or silver dollars. Other aluminium pigments produced by wet grinding are also suitable, but not the aluminium pigments produced by vacuum deposition processes. The said aluminium pigments are frequently used in paints and coatings and in particular also in automobile finishing. The pure aluminium flakes can be coated here with organic and/or inorganic materials in order to vary or optimise the use or colour properties of the pigments.

Likewise suitable as metal-effect pigments are bronze or brass pigments, but aluminium pigments are preferably employed.

Metal-effect pigments are commercially available from various manufacturers in a very wide variety of versions and sizes. The particle sizes for metal-effect pigments that are suitable here are, as d50 values, in the range from 5 to 50 μm, preferably in the d50 range from 10 to 35 μm. The particle sizes are reported by the manufacturers and are accordingly selectable, and consequently a separate particle-size determination is superfluous.

The size ratios of the metal-effect pigments employed in layer (B) of the coating according to the invention are not particularly limited within the ranges indicated, i.e. the usual commercially available metal-effect pigments can be employed.

For example, suitable silver-coloured metal-effect pigments are the aluminium pigments or pigment preparations Stapa® IL Hydrolan 2156, Stapa® IL Hydrolan 8154 and Stapa® IL Hydrolan 3580 from Eckart GmbH, Emeral® EMR-767E and Emeral® EMR-1227 from Toyal or APE-5245-C33 or AQUA PASTE® 5500-C43 from Silberline, to mention just a few.

Coloured metal-effect pigments which may be mentioned in particular are the pigments from the Meoxal® series from Merck KGaA, Meoxal® F120-30 CWT Taklamakan Gold, Meoxal® F120-51 CWT Victoria Red, Meoxal® F120-58 CWT Wahiba Orange and Meoxal® F121-51 CWT Atacama Red.

The metal-effect pigments are present in layer (B) of the layer package of the coating in an amount of 3 to 25% by weight, in particular from 15 to 20% by weight, based on the weight of layer (B). The amount of metal-effect pigments employed and the layer thickness of layer (B) are matched to one another.

Besides the metal-effect pigments, layer (B) of the layer package may optionally also comprise finely divided absorption pigments or dyes, but no further flake-form effect pigments. Examples of organic and inorganic coloured pigments and their size ratios have already been described above.

The layer thickness of layer (B) is restricted to a range from 2 to ≤10 μm in order that the attenuation of the radar radiation by the metal-effect pigments present therein is not excessive. However, slight attenuation of the radar radiation that still ensures regular operation of the radar device in whose beam path the coating according to the invention on the substrate lies is allowed. The dependence of the optimum layer thickness of layer (B) on the concentration of the metal-effect pigments in this layer (low concentrations allow a greater layer thickness in the range indicated) has already been described above. In addition, the particle size of the metal-effect pigments employed should be selected so that layer (B) as a separate layer does not represent an opaque layer. Layer thickness of layer (B) is taken to mean the thickness of the solidified and dry layer, i.e. the dry layer thickness.

"Radar-compatible" in the sense of the present invention is taken to mean a coating which has a permittivity of <30 on exposure to electromagnetic waves having a peak frequency of 76.5 GHz. Furthermore, it is necessary for the coating on a 350 μm PET substrate to have one-way transmission attenuation of <2 dB on exposure to electromagnetic waves having a peak frequency of 76.5 GHz. The one-way transmission attenuation is preferably <1.5 dB.

The measurement of the permittivity of the coating and the one-way transmission attenuation of the coating on the substrate is carried out using an RMS-D-77/79G instrument from perisens GmbH, Germany, in standard mode.

The layer thickness of layer (A) of the layer system according to the invention is set so that the total layer thickness of the layer package comprising layers (A) and (B) is in the range from 10 to 40 μm, preferably from 15 to 25 μm.

The binders employed for layers (A) and (B) of the layer package can be all conventional binders and binder systems which appear transparent in the solidified state. Recourse can be made here to all common types of binder which are employed in conventional coating processes and are compatible with the pigments employed. Solvent-based binder systems, aqueous binder systems and radiation-curing binder systems can be employed equally, so long as particular factors which are usual in the art regarding the choice of pigment and regarding the coating process are observed.

Both layer (A) and layer (B) of the coating according to the invention may comprise further additives which are usual in the art, such as, for example, fillers, inhibitors, flameproofing agents, lubricants, rheology aids, dispersants, redispersants, antifoams, flow-control agents, film formers, adhesion promoters, drying accelerators, photoinitiators, etc.

Depending on the binder system employed, the coating compositions employed for the production of layers (A) and (B) of the layer package optionally also comprise organic solvents and/or water, which, however, are no longer present in the coating according to the invention after solidification of the two layers. The solvent systems which are usual in the art can be employed without restrictions. Corresponding compositions for binder systems, including solvents and additives, are adequately known to the person skilled in the art and in some cases are also commercially available as finished products in the unpigmented state. A corresponding selection can be made by the person skilled in the art on the basis of the respective pigmentation to be employed and the desired coating process.

Possible substrates to which the layer package according to the invention comprising layers (A) and (B) is applied are plastic plates or films. The plastics usually used in automobile construction can be used, for example polycarbonate (PC), polypropylene (PP), polyurethane (PUR), polymethyl methacrylate (PMMA), acrylonitrile-butadiene-styrene (ABS) or acrylonitrileethylene-styrene (AES) substrates, to mention just a few. Plastic plates or plastic films of this type have a certain base attenuation of the radar signal, which should experience only a slight increase due to the coating located thereon. In respect of the radar capability of the coating according to the invention, the value of the base attenuation of the radar signal with respect to one-way transmission, which is present due to the respective substrate, is included in the measurement values. The base attenuation of the one-way transmission of the radar signal that is caused solely by the substrate is indicated separately in the examples. A measurement of the radar signal attenuation caused solely by the coating is not possible for technical equipment or production-related reasons.

It goes without saying that the substrates can be three-dimensionally shaped, i.e. can have a three-dimensional outer shape, depending on the application. Thus, example, a plastic plate which is intended to form part of a vehicle tailgate naturally has a different three-dimensional outer shape than a plastic plate intended as bumper. In general, the three-dimensional shape of the substrate is produced by means of conventional shaping processes before application of the coating according to the invention.

An essential core element of the coating according to the invention on a substrate is the above-described layer package comprising layers (A) and (B), which are arranged directly on one another, where, depending on the embodiment, either layer (A) or layer (B) represents the outermost layer of the layer package, viewed from the substrate. In addition, further layers, which may likewise be part of the coating according to the invention, may optionally also be located between the substrate and the first layer (layer (A) or layer (B), depending on the embodiment) and/or above the second layer (layer (B) or layer (A), depending on the embodiment).

Additional layers of this type are frequently employed in automobile construction in order either to improve the adhesion of the paint layers to the substrate, to set coloured accents and/or to improve the mechanical and chemical strength and the weathering resistance of the paint layers. These are primer layers, further colouring layers or an outermost clear coat, which is generally designed to be transparent and colourless. The coating in accordance with the present invention can advantageously have a primer layer and/or a clear coat. In accordance with the invention, all conventional materials which are widely used industrially and therefore do not require further explanation can be employed here.

The coating according to the invention on a substrate can advantageously be employed in all cases where radar devices are to be provided with covers which visually have a metallic finish without adversely affecting the functionality of the radar devices. This naturally applies, in particular, to cover parts used in vehicle construction. The coating according to the invention is preferably a vehicle finish. Owing to its good optical properties, this can of course also be used for finishes of all types which correspond visually to a conventional metallic finish, but only consume small amounts of metal-effect pigments usually employed. The radar beam transparency present may also play a subordinate role and the corresponding areas of use are not restricted to vehicle construction.

The present invention also relates to a process for the production of a radar-compatible coating comprising metal-effect pigments on a substrate, in which a layer package comprising a layer (A) and a layer (B) is applied to an optionally pre-coated substrate comprising a plastic plate or plastic film, where layer (A) comprises at least one pigment having absorbent properties and is free from metal-effect pigments, and where layer (B) comprises flake-form effect pigments, where the flake-form effect pigments are exclusively metal-effect pigments, and where layer (B) has a dry layer thickness in the range from 2 to ≤10 μm. Layers (A) and (B) of the layer package are arranged on the substrate in the sequence (A)-(B) or in the sequence (B)-(A).

All material details in relation to the suitable plastic substrates and the compositions of layers (A) and (B) have already been explained above. To this extent, reference is made thereto here.

The two layers of the layer package can be applied to the substrate by means of conventional coating processes, for example by spray processes, brushing processes, in-mould processes, roller coating processes, coil coating processes or curtain coating processes.

Coating processes of this type are usual in large-scale industry and can be employed expertly without particular adaptations being needed. Only the layer thickness of layer (B) is set during application so that a final dry layer thickness in the range from 2 to ≤10 μm is obtained, which is significantly less than the dry layer thickness of conventional metallic finishes which comprise comparable metal-effect pigments. However, the person skilled in the art will be able to set such a dry layer thickness without problems on the basis of his expert knowledge.

The plastic substrates employed, which have predefined radar properties, can optionally be pre-coated, for example with one or more primer and/or colouring layers. If, however, the coating as a whole is to have a radar-compatible character, it must be ensured that none of the layers optionally additionally present on the respective substrate comprises metal-effect pigments or other constituents which could adversely affect the requisite radar transparency of the coating as a whole.

Pre-coating of the plastic substrate with a primer layer is advantageous since such primer layers improve, inter alia, the mechanical stability of the coating as a whole and the adhesion of the first layer of the layer package to the substrate. In addition, outermost clear coats, which are generally designed to be colourless and transparent to visible light, are advantageous, in particular for mechanical stability and the weathering resistance of coatings. They are also preferably applied in the present invention to the upper layer of the layer package as outermost layer of the coating as a whole.

The present invention also relates to the use of the above-described coating comprising metal-effect pigments as radar-compatible vehicle finish on a vehicle part. It can be applied to all vehicle parts based on plastic substrates. Metal substrates are not suitable since they cannot guarantee the desired radar capability. The coating can be applied to external bodywork parts which are intended as outer cover or screening parts for radar devices installed in the vehicle interior, or also to the entire surface of suitable bodywork parts. Bodywork parts which may be mentioned are, in particular, bumpers, tailgates, radiator grilles, wings or parts thereof. The coating according to the invention can of course also be applied to vehicle parts other than those mentioned if only the visual appearance of a metallic finish is of interest and the radar capability is of secondary importance. In the latter case, the area of application of the invention is also not restricted to vehicle construction.

The invention is intended to be explained below with reference to examples, but not restricted thereto.

EXAMPLES

The substrate employed is in each case a PET film with a thickness of 350 μm (Hostaphan RN 350, Mitsubishi Polyester Film GmbH, DE). For determination of the L* values and the colour separation ΔE, black/white Leneta panels are coated in an analogous manner to the PET film. The coating is carried out as pneumatic spray coating. The binder employed is the preparation WBC 000 from MIPA SE, DE.

Example 1 (Reference)

As reference for the target visual appearance of the coating, a coating composition which is pigmented exclusively with aluminium pigments is applied to the film as a single layer.

| Pigment (PMC in %) | Al % | DLT (μm) | L* 15° over black | L* 75° over black | Flop index | ΔE* 75° |
|---|---|---|---|---|---|---|
| Al 18.0 | 100 | 21.8 | 150.085 | 34.058 | 16.913 | 0.082 |

PMC: pigment mass concentration

Al: aluminium pigment (Stapa® IL Hydrolan 2156, Stapa® IL Hydrolan 8154, 1:1 mixture, Eckart)

DLT: dry layer thickness

L*: lightness value L*in the L*a*b* colour space at a certain measurement angle

Flop index: measure of the lightness flop when the viewing angle is changed, determined in accordance with the formula:

$$\text{flop index} = \frac{2.69(L^*_{15^\circ} - L^*_{110^\circ})^{1.11}}{(L_{45^\circ})^{0.86}}$$

ΔE*: colour separation of samples in the L*a*b* colour space over standardised black and white background, determined in accordance with the formula:

$$\Delta E^* = \sqrt{(\Delta L^{*2} + \Delta a^{*2} + \Delta b^{*2})}$$

Examples 2 to 4 (Invention)

TABLE 1

| Pigment (PMC in %) | Al % | DLT (μm) | L* 15° over black | L* 75° over black | Flop index | ΔE 75° |
|---|---|---|---|---|---|---|
| Al 12.0 + 9602 (3x) | 23.8 | 18.5 | 141.486 | 33.214 | 17.007 | 3.965 |
| Al 15.0 + 9602 (3x) | 20.5 | 21.5 | 144.586 | 29.528 | 18.512 | 1.845 |
| Al 18.0 + 9602 (3x) | 20.8 | 18.1 | 150.674 | 29.540 | 19.270 | 0.650 |

In each case, 4 coating operations are carried out, with the first 3 coating operations being carried out with a coating composition pigmented exclusively with 18% by weight of Iriodin® 9602 Silver Grey SW (silver-grey interference pigment having a silver-grey absorption colour, containing iron oxide, Merck KGaA, Darmstadt). Since no interim drying takes place, the three coating operations give rise to layer (A) of the layer package according to the invention (triple application technologically necessitated here). As layer (B), a coating composition pigmented exclusively with 12% weight (Ex. 2), 15% by weight (Ex. 3) or 18% by weight (Ex. 4) of aluminium pigment mixture (see above) is applied.

The table shows the dry layer thickness of the coating as a whole comprising layers (A) and (B). With each coating operation, approximately the same amount of coating composition is applied in in each case.

The colorimetric measurement of the samples is carried out using a model BYKMac i colorimeter (Byk-Gardner) in SMC5 mode.

The L*15 values of layer (A) over black are carried out on sole use of organic or inorganic absorption pigments on a four-area, completely opaque coating on a standardised black/white-coated substrate. If flake-form effect pigments having absorbent properties are employed in layer (A), the colorimetric measurement of layer (A) and in particular the determination of the L*15 value over black is carried out by means of a coating having a pigment mass concentration of 18% by weight on the substrate.

The concentrations of the pigments employed and the layer thickness of the coating are indicated in each case for the individual layers and layer packages of the coating according to the invention.

The black/white panels used as substrate here comply with the ASTM E 1347 standard and are marketed by Leneta under the name Metopac T12G panels.

It can be seen from the table that an increasing concentration of aluminium pigment in the second layer, which is in each case only about 4 to 5 μm thick, leads to an increasing flop index and decreasing ΔE value, and the visual appearance of a conventional silver metallic finish in accordance with the reference example can be simulated well to very well with Examples 2 to 4.

Transmissivity of Radar Waves:

The following table shows the dielectric constant (permittivity) of the respective layer structure and the attenuation of the radar signal in dB for a single beam passage (76.5 GHz)

TABLE 2

| Example | Permittivity | Attenuation at 76.5 GHz (dB) |
|---|---|---|
| Reference Ex. 1 | 74.887 | 4.47 |
| 2 | 9.037 | 1.37 |
| 3 | 10.856 | 1.39 |
| 4 | 20.327 | 1.73 |
| PET substrate | 3.219 | 1.05 |

The inventive examples show a clear reduction in the attenuation of the radar radiation for a single beam passage compared with the original metallic finish in accordance with the reference example. At the same time as good hiding power and very good lightness flop, all coatings according to the invention are, depending on the technological requirements, significantly more suitable as radar-compatible coating for vehicle parts located in the beam path of radar devices than a conventional opaque metallic finish comprising aluminium pigments.

Examples 5 to 7

With PET substrates and a coating process as described in Example 1, a completely opaque coating in the RAL shades 7030 (stone grey, Example 5), 7033 (cement grey, Example 6) and 7035 (light grey, Example 7) is in each case applied to the substrate as layer (A). A layer (B) pigmented with 15% by weight of flake-form aluminium pigments (Stapa® IL Hydrolan 2156, Stapa® IL Hydrolan 8154, 1:1 mixture, Eckart) is in each case applied to layer (A).

The individual results with respect to the colorimetric properties or radar capability of the respective coatings can be seen in Tables 3 and 4.

TABLE 3

| Pigment (PMC in %) | Al % | DLT (μm) | L* 15° over black | L* 75° over black | Flop index |
|---|---|---|---|---|---|
| RAL 7030 + Al 15.0 | 22 | 25.2 | 135 | 38.8 | 13.3 |
| RAL 7033 + Al 15.0 | 22 | 25.2 | 134 | 37.5 | 13.3 |
| RAL 7035 + Al 15.0 | 22 | 27.1 | 137 | 44.3 | 12.1 |

TABLE 4

| Example | Permittivity | Attenuation at 76.5 GHz (dB) |
|---|---|---|
| 5 | 15.0 | 1.67 |
| 6 | 15.9 | 1.75 |
| 7 | 21.1 | 2.07 |
| PET substrate | 3.219 | 1.05 |

The examples show that a metallic-like visual appearance can be obtained with high hiding power and satisfactory flop index, where the coatings in Examples 5 and 6 have one-way attenuation of the radar signal in the target range and in Example 7 merely with minimal exceeding of the target range.

Example 8

A coating (B) pigmented with 18% by weight of aluminium pigments as described above is applied to a PET substrate in accordance with Example 1 and by means of the spray application mentioned in Example 1. A coating pigmented with 18% by weight of Colorstream® F10-51 Lava Red (Merck KGaA, iron oxide on $SiO_2$ substrate) is applied in three coating operations as layer (A).

The individual results with respect to the colorimetric properties or radar capability of the respective coatings can be seen in Tables 5 and 6.

TABLE 5

| Pigment (PMC in %) | Al % | DLT (μm) | L* 15° over black | L* 75° over black | ΔE 75° | Flop index |
|---|---|---|---|---|---|---|
| Al 18.0 + 3x Lava Red | 25 | 18.1 | 85 | 19.2 | 1.26 | 16.2 |

TABLE 6

| Example | Permittivity | Attenuation at 76.5 GHz (dB) |
|---|---|---|
| 8 | 4.1 | 1.80 |
| PET substrate | 3.219 | 1.05 |

Example 8 shows that a coating which has a good light/dark flop and exhibits significantly lower one-way attenuation of the radar signal than a standard commercial metallic coating exclusively with aluminium pigments is also obtained in the case of a layer structure (B)-(A) on a substrate. The coating according to the invention exhibits a visually attractive red metallic character and good hiding powers.

The invention claimed is:

1. A radar-compatible coating comprising metal-effect pigments on a substrate, wherein the coating has at least one layer package consisting of:
 - a layer (A) which comprises at least one pigment having absorbent properties and is free from metal-effect pigments, and
 - a layer (B) which comprises flake-form effect pigments, where the flake-form effect pigments are exclusively metal-effect pigments and where the flake-form effect pigments are not aluminum pigments produced by a vacuum deposition process, and where layer (B) has a layer thickness in the range from 2 to 10 μm,
 - wherein layer (A) comprises the pigment(s) having absorbent properties in a concentration in the range from 10 to 25% by weight, based on the weight of layer (A), and wherein layer (A) comprises, as flake-form effect pigment, an interference pigment which has a silver-grey absorption color or a red absorption color.

2. The coating according to claim 1, wherein layer (A) comprises organic absorption pigments, inorganic absorption pigments and/or flake-form effect pigments having absorbent properties.

3. The coating according to claim 1, wherein the layer package consisting of layers (A) and (B) has a total layer thickness in the range from 10 to 40 μm.

4. The coating according to claim 1, wherein layer (A) comprises, as flake-form effect pigment, an interference pigment which has a silver-grey absorption color.

5. The coating according to claim 1, wherein layer (A) comprises, as flake-form effect pigment, an interference pigment which has a red absorption color.

6. The coating according to claim 1, wherein the metal-effect pigments of layer (B) include an aluminum pigment.

7. The coating according to claim 1, wherein layer (B) comprises the metal-effect pigments in a concentration in the range from 3 to 25% by weight, based on the weight of layer (B).

8. The coating according to claim 1, wherein the substrate is a plastic plate or film, where the plate or film may optionally have a three-dimensional outer shape.

9. The coating according to claim 1, further comprising one or more layers located between the substrate and the layer package comprising layers (A) and (B) and/or above the layer package.

10. The coating according to claim 9, wherein the further layer or layers is (are) a primer layer and/or an outermost clear coat.

11. The coating according to claim 1, wherein said coating is a vehicle finish.

12. A process for production of a radar-compatible coating comprising metal-effect pigments on a substrate, the process comprising:

applying a layer (A) which comprises at least one pigment having absorbent properties and is free from metal-effect pigments to an optionally pre-coated substrate comprising a plastic plate or plastic film, wherein layer (A) comprises the pigment(s) having absorbent properties in a concentration in the range from 10 to 25% by weight, based on the weight of layer (A), and wherein layer (A) comprises, as flake-form effect pigment, an interference pigment which has a silver-grey absorption color or a red absorption color, and subsequently applying a layer (B) which comprises flake-form effect pigments, where the flake-form effect pigments are exclusively metal-effect pigments to layer (A), and wherein layer (B) has a dry layer thickness in the range from 2 to ≤10 μm, and where the flake-form effect pigments are not aluminum pigments produced by a vacuum deposition process or applying a layer (B) which comprises flake-form effect pigments, where the flake-form effect pigments are exclusively metal-effect pigments, and where the flake-form effect pigments are not aluminum pigments produced by a vacuum deposition process, and layer (B) has a dry layer thickness in the range from 2 to ≤10 μm, to an optionally pre-coated substrate comprising a plastic plate or plastic film, and subsequently applying a layer (A) which comprises at least one pigment having absorbent properties and is free from metal-effect pigments to layer (B), wherein layer (A) comprises, as flake-form effect pigment, an interference pigment which has a silver-grey absorption color or a red absorption color, and wherein layer (A) comprises the pigment(s) having absorbent properties in a concentration in the range from 10 to 25% by weight, based on the weight of layer (A).

13. A vehicle part containing a substrate comprising a plastic plate or plastic film which has at least one coating according to claim 1.

14. The coating according to claim 1, wherein layer (B) comprises the metal-effect pigments in a concentration in the range from 15 to 20% by weight, based on the weight of layer (B).

15. The coating according to claim 1, wherein layer (A) comprises the pigment(s) having absorbent properties in a concentration in the range from 15 to 20% by weight, based on the weight of layer (A).

16. The coating according to claim 1, wherein, in layer (A), the pigment(s) having absorbent properties are selected from organic absorption pigments and inorganic absorption pigments, and the organic absorption pigments and inorganic absorption pigment(s) have a particle diameter in the range from 10 to 500 nm.

17. The coating according to claim 1, wherein, in layer (A), the pigment(s) having absorbent properties are selected from interference pigments having absorbent properties and the interference pigments have particle sizes in the range from 1 to 100 um, and thicknesses in the range from 0.1 to 2 μm.

18. The coating according to claim 1, wherein layer (A) comprises the pigment(s) having absorbent properties in a concentration in the range from 18 to 25% by weight, based on the weight of layer (A).

19. The coating according to claim 1, wherein layer (A) comprises flake-form effect pigments having absorbent properties that are interference pigments comprising iron oxides, titanium suboxides or chromium oxides or a layer consisting of carbon.

20. The process according to claim 12, wherein layers (A) and (B) are applied by means of a spray process, brushing process, roller coating process, coil coating process, curtain coating process or in-mold process.

21. The process according to claim 12, wherein the substrate has been pre-coated with a primer layer.

22. The process according to claim 12, further comprising applying a clear coat to layer (B) of layer package (A) (B) or applying a clear coat to layer (A) of layer package (B) (A) as outermost layer of the coating.

23. A method of covering a radar device with a cover having a metallic finish, the method comprising covering the radar device with a substrate according to claim 1 to form a cover, wherein said cover does not adversely affect the functionality of the radar device.

* * * * *